Oct. 5, 1937.   O. E. BECKER   2,094,631
STEERING WHEEL
Filed Feb. 23, 1937   2 Sheets-Sheet 1

Otto Edward Becker
INVENTOR

Oct. 5, 1937.   O. E. BECKER   2,094,631
STEERING WHEEL
Filed Feb. 23, 1937   2 Sheets-Sheet 2
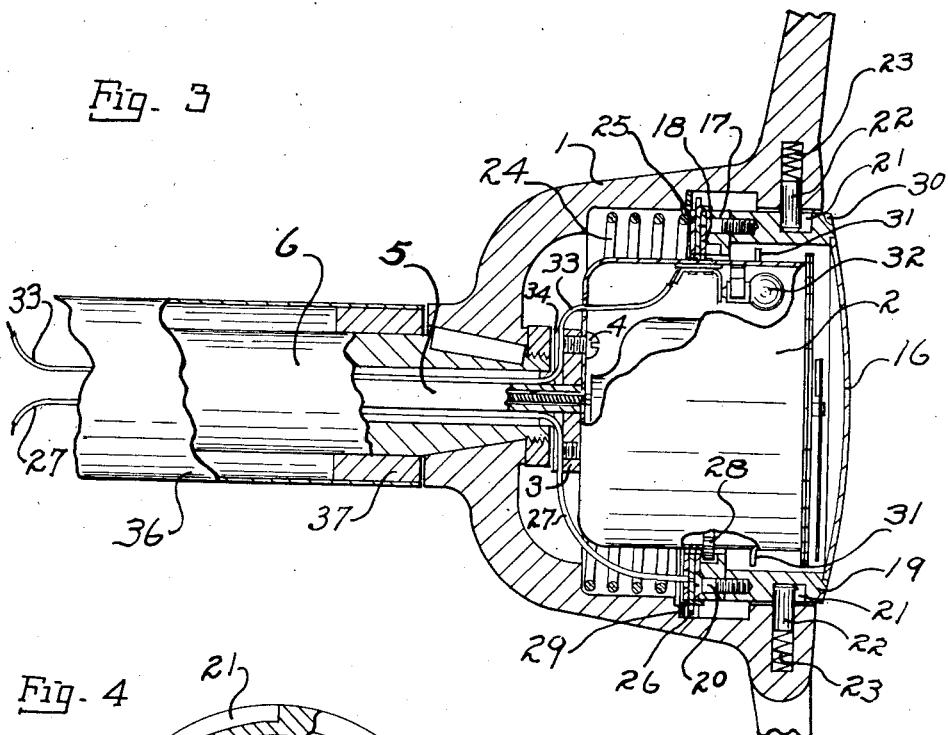
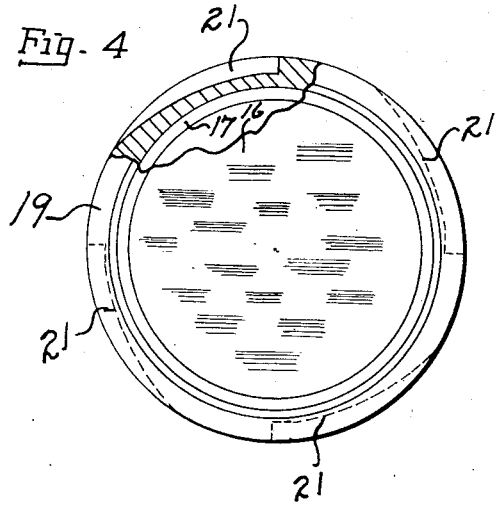
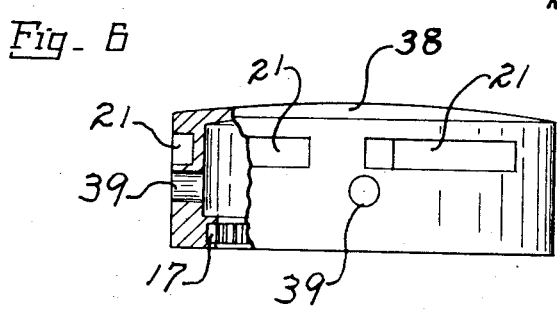
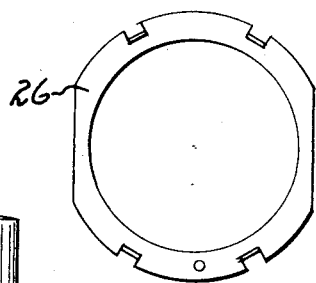
Otto Edward Becker
INVENTOR Patented Oct. 5, 1937

2,094,631

UNITED STATES PATENT OFFICE 2,094,631

STEERING WHEEL

Otto Edward Becker, Los Angeles, Calif.

Application February 23, 1937, Serial No. 127,215

5 Claims. (Cl. 180—78)

The primary object of my invention is to produce a steering wheel that has a speedometer disposed central thereof so the operator may without undue distraction check the speed of his vehicle.

A further object of my invention is to provide a steering wheel that has a speedometer disposed centrally of the wheel wherein the instrument dial glass also serves as the horn button.

A further object of my invention is to provide a steering wheel with a speedometer disposed therein, wherein the combination instrument glass and horn button also serves as the trip reset mechanism.

A further object of my invention is to provide a steering wheel with a speedometer disposed therein wherein the instrument may be readily removed in the event that repair or other service is necessary.

With these and incidental objects in view the invention consists in certain novel features of construction and combination of parts, a preferred form of which is hereinafter shown with reference to the drawings which accompany and form a part of this specification.

In the drawings:

Fig. 3 is a fragmentary cross-sectional view taken on line A—A, Fig. 2.

Fig. 4 is a plan view of the combination instrument dial glass, horn button, and reset device partially in section to show the cam slot.

Fig. 5 is a plan view of the steering gear end plate.

Fig. 6 is another form of horn button made of one piece.

Fig. 7 is a plan view of the horn washer.

Like reference characters refer to like parts throughout the several views.

Figure 1:
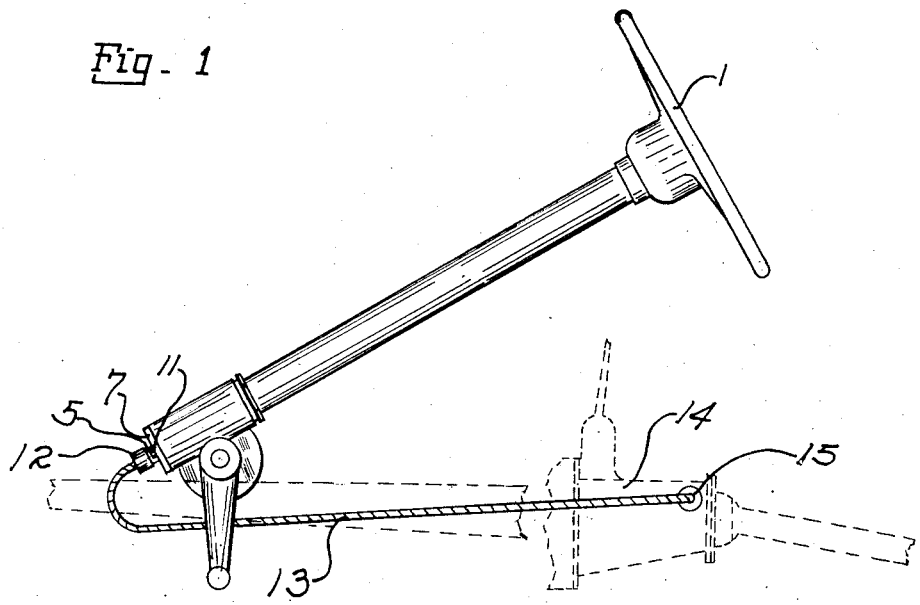
Fig. 1 is a side elevation of a steering gear with my wheel attached and showing the speedometer drive.
Figure 2:
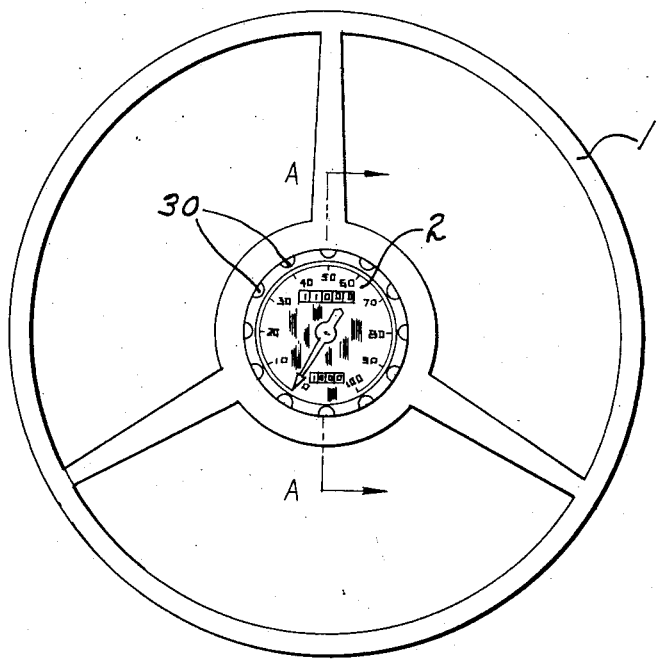
Fig. 2 is a plan view of the steering wheel.

My invention consists of a steering wheel 1 attached to a conventional steering gear. This steering wheel has a large cavity to accommodate the speedometer 2. The speedometer does not touch the steering wheel but is made fast to the flange 3 by the screws 4. This flange is secured to the inner tube 5, which passes through the steering post 6 and through the end plate 7. The tube is keyed to the flange by the key 8 and gripped by the bore of the flange when the bolt 9 is tightened, collapsing the slot 10. The flange is secured to the steering post by the cap screws 11. The lower end of the tube 5 is threaded to receive the standard speedometer connection nut 12 which carries the drive tube 13. The other end of the drive tube is connected to the transmission 14 by the nut 15. The combination horn button, instrument glass and reset device consists of the glass 16, the shrouded internal gear 17, the ring 18, and the tube 19. The internal gear and the ring are secured to the tube 19 by the screws 20. I provide the cam slots 21 to receive the spring loaded pins 22 which are disposed in the steering wheel and pushed inwardly by the springs 23. To assemble the device the horn spring 24 is first placed in the wheel, the friction washer 25 is placed on the spring, the metal washer 26 having the horn wire 27 soldered thereto rests upon the friction washer. The shrouded gear 17, the ring 18 and the tube 19 are so assembled that the shrouded gear engages the reset gear 28. The speedometer is screwed to the flange 3 and the tube 5 inserted in the steering post 6. Before the speedometer is placed into the cavity the spring loaded pins must be held in an outward position until the tube 19 passes these pins. This may be accomplished by placing a band of spring shim stock against the pins until the tube is in position, when the shim may be removed. The tube 5 is clamped in position by the bolt 9 and by pressing downward on the tube 19 the horn spring will compress allowing the pins 22 to engage the cam slots 21. The device is now in position and ready for operation which is accomplished as follows.

It may be seen that the cam slots 21 are wider than the pins 22, hence if pressure is exerted on the glass 16 or the tube 19 the spring 24 will be compressed. This movement will cause the horn wire ring 26 to contact the grounded element 29 thus completing the horn circuit. This pressure does not need to be perpendicular as there is sufficient play between the steering wheel and the tube 19 to permit tipping. In other words one may press any portion of the tube 19 to allow the horn wire ring 26 to contact the ground element 29. In order to reset the speedometer the tube 19 must be turned to the right. To facilitate the operation I provide the flutes 30. This action causes the cam slots 21 to push the pins 22 outward, compressing the springs 23. This continues until the pins are completely out of the slots and permits the spring 24 to push the assembly upward until the internal gear 17 strikes the stops 31. As the internal gear is shrouded, its upward movement causes the reset gear to shift upward into a position required for resetting. The tube 19 may again be turned, thus imparting motion to the reset gear 28 through the internal gear 17, thereby resetting the trip's indicator. When reset the tube 19 may again be pressed downward until the pins 22 move into the cam slots 21. This also moves the reset gear downward so that the speedometer is again in normal operating condition. The reset mechanism is identical with that used on conventional speedometers, the only difference being that I operate it through the medium of an internal gear. I provide a light 32 within the speedometer so that by using a transparent dial the numerals may be readily seen at night without glare. I do not wish to limit the device to this type of illumination as several of the well known methods may be used. The wires 27 and 33 lie in grooves 34 of the flange 3 and pass out through the openings 35 in the end plate 7. The mast jacket 36 and bushing 37 are conventional.

In Fig. 6, I show a one piece transparent combination instrument dial glass, horn button and reset device and designate it by the numeral 38. I provide the holes 39 so that movable stops such as screws may be used thus displacing the stops 31. This is necessary in order to assemble this one piece combination to the speedometer. In Fig. 7 I show the horn wire ring 26 having the sides cut. This is also done to permit assembling.

In the claims, the term "speedometer" is intended to denote the conventional combined speedometer and odometer.

While the form of mechanism herein shown and described is admirably adapted to fulfill the object primarily stated, it is to be understood that it is not intended to confine the invention to the two forms of embodiment herein shown and described, as it is susceptible of embodiment in various forms, all coming within the scope of the claims which follow.

What I claim is:

1. A steering wheel having a speedometer disposed centrally thereof, a tube surrounding the speedometer for operating the horn, a glass covering the top of the tube to protect the speedometer and an internal gear for resetting the speedometer secured to the lower end of the tube.

2. A steering wheel having a speedometer disposed centrally thereof, a combination instrument glass, horn button and reset device enclosing said speedometer, a spring for holding said combination device in an upward position, a multiplicity of spring loaded pins for engaging cam slots in the combination instrument glass, horn button and reset device, and means for illuminating the speedometer.

3. A steering wheel having a cavity centrally thereof, a speedometer disposed within the cavity, a tube encircling said speedometer, a gear secured to the lower end of the tube for engaging the speedometer reset gear, a multiplicity of cam slots in the side of the tube, spring loaded pins for engaging said cam slots and a spring for holding said tube in an upward position.

4. A steering wheel having a cavity therein, a speedometer disposed within the cavity, a tube surrounding the speedometer, gear means engaging the speedometer reset gear secured to the lower end of the tube and means for engaging the gear means with the reset mechanism.

5. A steering wheel having a circular cavity therein, a speedometer disposed within the cavity, a one piece transparent combination instrument glass, horn button and reset device forming a closure for said cavity, means for holding said combination device in position and means for engaging the reset device with the reset mechanism of the speedometer.

OTTO EDWARD BECKER.